Patented Oct. 17, 1939

2,176,420

UNITED STATES PATENT OFFICE 2,176,420

NITRODYESTUFF OF THE AZINE SERIES

Richard Fleischhauer, Frankfort-on-the-Main-Fechenheim, Germany, assignor to General Aniline Works, Inc., New York, N. Y., a corporation of Delaware No Drawing. Application November 26, 1938, Serial No. 242,565. In Germany November 29, 1937

4 Claims. (Cl. 260—267)

This invention relates to new nitrodyestuffs of the azine series, more particularly to those of the general formula:

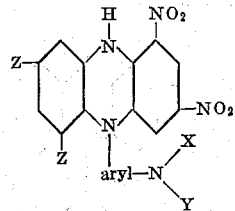

wherein one Z stands for an amino group and the other Z stands for a sulfonic acid group, X stands for a member selected from the group consisting of hydrogen and alkyl and aralkyl groups, Y stands for an acyl group, whereby X and Y together contain at least five carbon atoms, and aryl means a radicle of the benzene series.

The present new dyestuffs are obtained for instance by condensing amino compounds of the general formula:

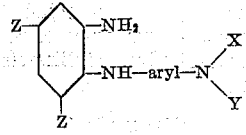

wherein X, Y, Z and aryl have the above signification, with such substitution derivatives of 1,3,5-trinitrobenzene as contain in the 2-position a substituent capable of being replaced, the condensation reaction being performed in such a manner that formation of an azine nucleus occurs. Advantageously this result may be obtained by carrying out the condensation reaction in two stages, whereby at first the initial material is treated in an aqueous solution with weakly acid-binding agents such as for example sodium acetate, calcium carbonate, magnesium carbonate and sodium bicarbonate. In this manner a diphenylamine derivative is formed which is then converted into the corresponding azine compound by the action of stronger alkaline agents at elevated temperatures, alkali nitrite being split off. However, the formation of the diphenylamine derivative and the azine ring formation may also be performed simultaneously in a single reaction.

The new dyestuffs are distinguished by a good levelling power, and the dyeings obtained with these dyestuffs exhibit good fastness to fulling, ironing, sea-water, light and perspiration. Owing to the combination of these different good properties the new products are particularly valuable dyestuffs. Moreover they are in many cases applicable for the dyeing of animal fibers from a neutral bath.

In the British Patent No. 348,902 there are described nitrodyestuffs of the azine series which possess a constitution analogous to that of the present new dyestuffs. These known dyestuffs, however, are surpassed by the new products by a considerably better fastness to fulling, seawater and perspiration of the dyeings obtained on animal fibers. Moreover the new dyestuffs possess in many cases a better tinctorial power when dyed from a neutral bath.

In order to further illustrate my invention the following examples are given, the parts being by weight and all temperatures in degrees centigrade.

Example 1

24 parts of 1-(N-benzoyl-ethylamino)-4-aminobenzene are mixed with 29 parts of 1-chloro-2,4-dinitrobenzene-6-sulfonic acid, about 500 parts of water and 50 parts of chalk, and the mixture is heated to boiling in an apparatus provided with a reflux condenser. When the condensation is complete, the reaction mixture is rendered alkaline by the addition of sodium carbonate and then the solution is filtered while hot. The condensation product formed is precipitated from the filtrate by the addition of sodium chloride or potassium chloride, filtered off and washed with salt water.

The paste of the sodium salt of the 2',4'-dinitro-4-(N-benzoyl-ethylamino)-diphenylamine-6'-sulfonic acid thus obtained is introduced into a boiling mixture of water, acetic acid and iron turnings. When the reduction is complete, the mixture is rendered alkaline by the addition of sodium carbonate, heated to boiling again for a short time and filtered. From the filtrate the sodium salt of the 2',4'-diamino-4-(N-benzoyl-ethylamino)-diphenylamine-6'-sulfonic acid formed is precipitated by the addition of sodium chloride, filtered off and washed with salt water. A portion of the paste obtained which corresponds to 47 parts of the dry sodium salt of 2',4'-diamino-4-(N-benzoyl-ethylamino)-diphenylamine-6'-sulfonic acid is dissolved by heating in about 1000 parts of water. Then 70 parts of calcium carbonate and 24.3 parts of 2,4,6-trinitroanisole are added and the mixture is heated to 60-80° for about 3 hours while stirring. Then the aqueous solution of 22.3 parts of sodium carbonate is slowly added and the mixture is stirred at about 90° for about 1 to 2 hours. After that the solution is diluted with water, filtered while hot and the filtrate is cooled to about 30–40°. At this temperature the dyestuff formed is precipitated by slowly adding sodium chloride, filtered off and, if necessary, treated with dilute sodium chloride solution in order to remove yellow coloured impurities. The dyestuff which corresponds to the formula:

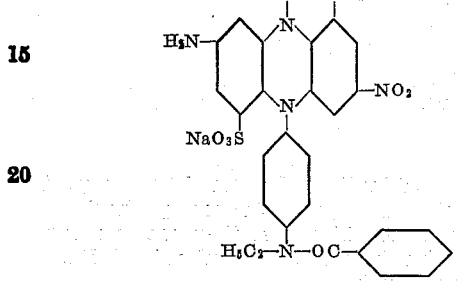

is, when dry, a brownish-black powder, easily soluble in water, dyeing wool and silk full brown shades of good fastness to fulling, ironing, light, sea-water and perspiration. The dyestuff also exhibits a good levelling power.

By replacing in the above example the 1-chloro-2.4-dinitrobenzene-6-sulfonic acid by the same amount of 1-chloro-2.6-dinitrobenzene-4-sulfonic acid, an isomeric dyestuff is obtained which exhibits nearly the same properties as the above described dyestuff.

By employing 27.4 parts of 1-(N-cyclohexyl-propionyl - amino - ethylamino) - 4 - aminobenzene instead of the 1-(N-benzoyl-ethylamino)-4-aminobenzene in the above example a similar dyestuff is obtained which is a brownish-black powder, soluble in water and dyeing wool more yellowish brown shades of very good fastness to fulling, ironing, seawater and perspiration and of a good fastness to light.

*Example 2*

26.8 parts of 1-(N-benzoyl-n-butylamino)-4-aminobenzene are condensed with 29 parts of 1-chloro-2.6-dinitrobenzene-4-sulfonic acid in an analogous manner as described in Example 1 and the condensation product obtained is reduced to the corresponding amino compound. 50 parts of the sodium salt of this amino compound are condensed with 24.8 parts of 2,4,6-trinitro-1-chlorobenzene in a likewise analogous manner as described in Example 1. The dyestuff thus obtained of the formula:

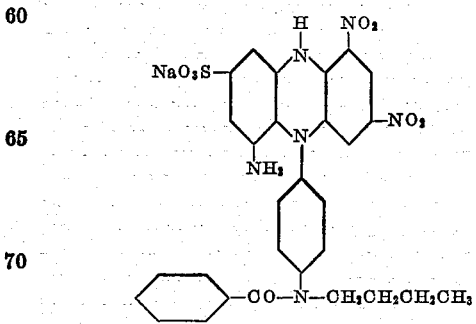

is separated and dried. It is a blackish-brown powder, soluble in water and dyeing wool and silk full brown shades of good fastness to fulling, ironing, seawater, perspiration and light.

The corresponding dyestuff which is obtained by employing 25.4 parts of 1-(N-benzoyl-iso-propylamino)-4-aminobenzene is a blackish-brown powder, soluble in water and dyeing wool somewhat more yellowish brown shades. A similar dyestuff is obtained by employing 24.6 parts of 1-(N-hexahydrobenzoyl-ethyl-amino)-4-aminobenzene, dyeing wool yellowish-brown shades.

*Example 3*

25.4 parts of 4-(N-benzoyl-ethylamino)-2-amino-1-methylbenzene are condensed with 29 parts of 1-chloro-2,6-dinitrobenzene-4-sulfonic acid in an analogous manner as described in Example 1 and the condensation product obtained is reduced to the corresponding amino compound. 48 parts of the sodium salt of this amino compound are condensed with 24.8 parts of 2,4,6-trinitro-1-chlorobenzene in an analogous manner as indicated in Example 1. The dyestuff formed of the formula:

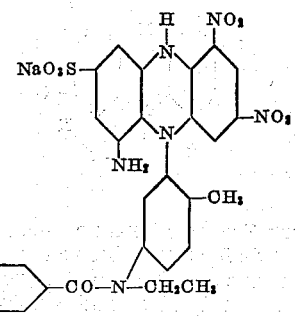

is filtered off and dried. It is a violettish-black powder, soluble in water and dyeing wool dark red shades of good fastness to fulling, seawater and perspiration.

The corresponding dyestuff which is obtained by employing 5-(N-benzoyl-ethylamino)-2-amino-1-methylbenzene is a violettish black powder, soluble in water and dyeing wool somewhat more bluish dark red shades of likewise good fastness properties.

*Example 4*

27.6 parts of 1-(N-4'-methylphenylsulfonyl-ethylamino)-4-aminobenzene are condensed with 29 parts of 1-chloro-2.4-dinitrobenzene-6-sulfonic acid in an analogous manner as described in Example 1 and the condensation product formed is reduced to the corresponding amino compound. 53 parts of the sodium salt of this amino compound are condensed with 24.3 parts of 2,4,6-trinitro-anisole. Thereby a dyestuff is obtained of the formula:

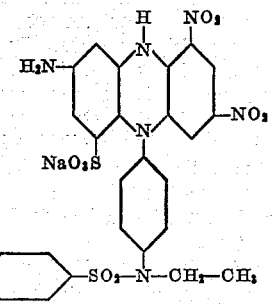

which is isolated and dried. It is a brownish black powder, soluble in water and dyeing wool yellowish-brown shades of good fastness to fulling, ironing, seawater, light and perspiration.

*Example 5*

24.1 parts of 1-(N-β-chloropropionyl-isopropylamino)-4-aminobenzene (which may be prepared for instance by treating 1-isopropylamino-4-nitrobenzene with β-chloro-propionic acid chloride and reducing the condensation product obtained) are condensed with 1-chloro-2.4-dinitrobenzene-6-sulfonic acid in an analogous manner as described in Example 1. The condensation product is reduced to the corresponding amino compound and 47 parts of the sodium salt thereof are condensed with 24.3 parts of 2,4,6-trinitroanisole. The dyestuff thus obtained of the formula:

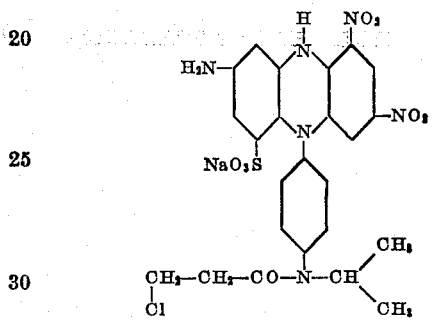

is separated and dried. It is a dark-brown powder, soluble in water and dyeing wool brown shades of good fastness to fulling, ironing, seawater, light and perspiration. The dyestuff has a good levelling power.

The corresponding dyestuffs obtained by employing 1-(N-acetyl-benzylamino)-4-aminobenzene or 1-(N-benzoyl-benzylamino)-4-aminobenzene are dark brown powders and dye wool yellowish-brown shades of similar good fastness properties.

*Example 6*

24.6 parts of 1-cyclohexylpropionylamino-4-aminobenzene which may be prepared for example by condensing 4-nitroaniline with cyclohexylpropionic acid chloride and reducing the condensation product obtained, are condensed with 1-chloro-2.4-dinitrobenzene-6-sulfonic acid in an analogous manner as described in Example 1. The condensation product formed is reduced to the corresponding amino compound and 47 parts of the sodium salt thereof are condensed with 24.3 parts of 2,4,6-trinitroanisole. The dyestuff thus obtained of the formula:

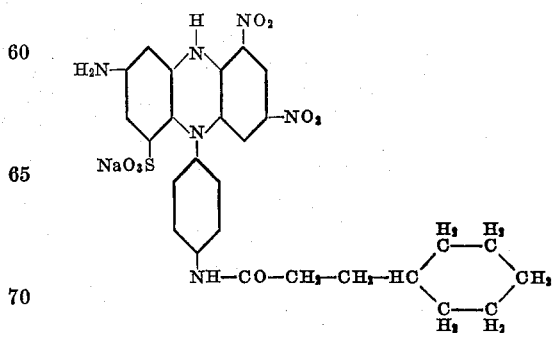

is separated and dried. It is a dark brown powder, soluble in water and dyeing wool and silk dark reddish brown shades of good fastness to fulling, ironing, seawater, light and perspiration.

Similar dyestuffs with likewise good properties are obtained by replacing in the above example the 1-cyclohexylpropionylamino-4-aminobenzene by other monoacyl derivatives of the 1.4-diaminobenzene which are substituted by the radicles of aliphatic carboxylic acids with about 6 to 10 carbon atoms such as for example caprylic or capric acid. One may also introduce the radicles of mixtures of these aliphatic acids into the said amino compound. By employing for instance for the above example a mixture of monoacyl-diaminobenzenes of the general formula:

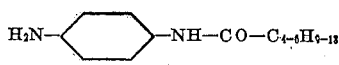

a dyestuff is obtained which corresponds to the following formula:

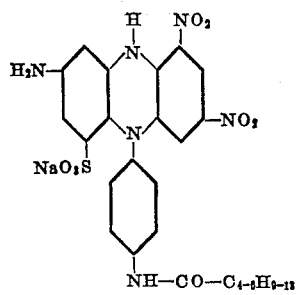

It is a black powder, soluble in water and dyeing wool and silk dark reddish-brown shades of good fastness to fulling, light, seawater and perspiration.

I claim:

1. Nitrodyestuffs of the azine series of the general formula:

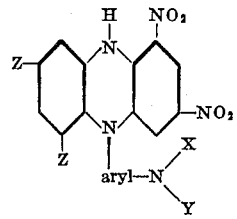

wherein one Z stands for an amino group and the other Z stands for a sulfonic acid group, X stands for a member selected from the group consisting of hydrogen and alkyl and aralkyl groups, Y stands for an acyl group, whereby X and Y together contain at least five carbon atoms, and aryl means a radicle of the benzene series, which dyestuffs are distinguished by a good levelling power and yield on animal fibers valuable brown to red shades of good fastness to fulling, ironing, seawater, light and perspiration.

2. The nitrodyestuff of the formula:

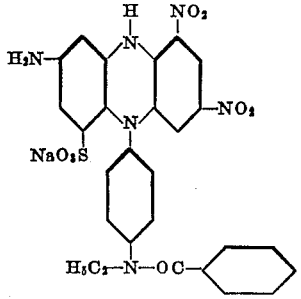

which dyestuff is a brownish-black powder, soluble in water and dyeing wool and silk full brown shades of good fastness to fulling, ironing, light, seawater and perspiration.

3. The nitrodyestuff of the formula:

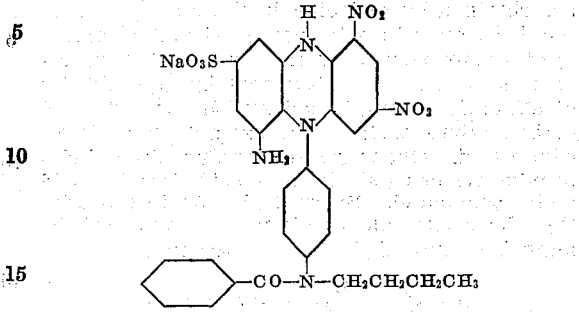

which dyestuff is a blackish-brown powder, soluble in water and dyeing wool and silk full brown shades of good fastness to fulling, ironing, seawater, perspiration and light.

4. The nitrodyestuff of the formula:

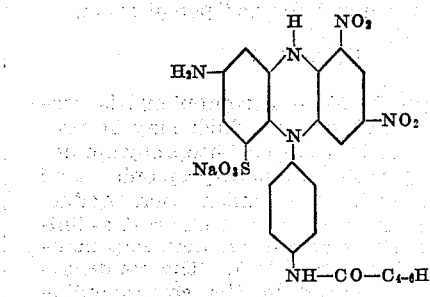

which dyestuff is a black powder, soluble in water and dyeing wool and silk dark reddish-brown shades of good fastness to fulling light, seawater and perspiration.

RICHARD FLEISCHHAUER.